(12) United States Patent
Hannan et al.

(10) Patent No.: US 8,897,813 B2
(45) Date of Patent: Nov. 25, 2014

(54) LTE USER EQUIPMENT POSITIONING SYSTEM AND METHOD

(75) Inventors: Ariful Hannan, Sterling, VA (US); Khalid W. Al-Mufti, Sterling, VA (US)

(73) Assignee: Andrew LLC, Hickory, NC (US)

( * ) Notice: Subject to any disclaimer, the term of this patent is extended or adjusted under 35 U.S.C. 154(b) by 438 days.

(21) Appl. No.: 13/365,709

(22) Filed: Feb. 3, 2012

(65) Prior Publication Data

US 2013/0203447 A1  Aug. 8, 2013

(51) Int. Cl.
*H04W 24/00* (2009.01)

(52) U.S. Cl.
USPC ........................................ 455/456.5; 370/338

(58) Field of Classification Search
USPC .............................. 455/456.1, 456.5; 370/338
See application file for complete search history.

(56) References Cited

U.S. PATENT DOCUMENTS

| | | | |
|---|---|---|---|
| 3,150,372 A | 9/1964 | Groth, Jr. |
| 3,659,085 A | 4/1972 | Potter et al. |
| 4,728,959 A | 3/1988 | Maloney |
| 4,814,751 A | 3/1989 | Hawkins |
| 4,845,504 A | 7/1989 | Roberts et al. |
| 4,891,650 A | 1/1990 | Sheffer |
| 5,056,106 A | 10/1991 | Wang |
| 5,218,618 A | 6/1993 | Sagey |
| 5,317,323 A | 5/1994 | Kennedy et al. |
| 5,327,144 A | 7/1994 | Stilp et al. |
| 5,365,544 A | 11/1994 | Schilling |
| 5,372,144 A | 12/1994 | Mortier et al. |
| 5,404,376 A | 4/1995 | Dent |
| 5,423,067 A | 6/1995 | Manabe |
| 5,465,289 A | 11/1995 | Kennedy |
| 5,506,863 A | 4/1996 | Meidan et al. |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,559,864 A | 9/1996 | Kennedy |
| 5,592,180 A | 1/1997 | Yokev et al. |
| 5,608,410 A | 3/1997 | Stilp et al. |

(Continued)

FOREIGN PATENT DOCUMENTS

| | | |
|---|---|---|
| JP | 06-347529 | 12/1994 |
| WO | 2006088472 A1 | 8/2006 |

OTHER PUBLICATIONS

Rick Roberts, "Project: IEEE P802.15 Working Group for Wireless Personal Area Networks (WPANS)," Harris Corporation, Melbourne Florida, Oct. 4, 2004, pp. 1-11.

(Continued)

*Primary Examiner* — Sam Bhattacharya
(74) *Attorney, Agent, or Firm* — Duane Morris LLP

(57) ABSTRACT

A method of determining the location of a mobile device in a communications network having a plurality of nodes, one of the plural nodes serving the device. Observed positioning measurements for a mobile device may be received from the serving node and uplink enhanced cell identification (E-CID) positioning measurements received from the mobile device. One or more ranges between ones of the plural nodes and the mobile device may then be determined as a function of the received observed positioning measurements and the received uplink E-CID positioning measurements. A geographic location of the mobile device may then be estimated as a function the determined one or more ranges.

23 Claims, 10 Drawing Sheets

(56) References Cited

U.S. PATENT DOCUMENTS

| | | |
|---|---|---|
| 5,614,914 A | 3/1997 | Bolgiano et al. |
| 5,675,344 A | 10/1997 | Tong et al. |
| 5,736,964 A | 4/1998 | Ghosh et al. |
| 5,815,538 A | 9/1998 | Grell et al. |
| 5,825,887 A | 10/1998 | Lennen |
| 5,870,029 A | 2/1999 | Otto et al. |
| 5,920,278 A | 7/1999 | Tyler et al. |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A | 11/1999 | Yost |
| 6,014,102 A | 1/2000 | Mitzlaff et al. |
| 6,047,192 A | 4/2000 | Maloney |
| 6,091,362 A | 7/2000 | Stilp |
| 6,097,336 A | 8/2000 | Stilp |
| 6,097,709 A | 8/2000 | Kuwabara |
| 6,097,959 A | 8/2000 | Yost |
| 6,101,178 A | 8/2000 | Beal |
| 6,108,555 A | 8/2000 | Maloney et al. |
| 6,108,558 A | 8/2000 | Vanderspool, II |
| 6,115,599 A | 9/2000 | Stilp |
| 6,115,605 A | 9/2000 | Siccardo et al. |
| 6,119,013 A | 9/2000 | Maloney et al. |
| 6,127,975 A | 10/2000 | Maloney |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,233,459 B1 | 5/2001 | Sullivan et al. |
| 6,246,884 B1 | 6/2001 | Karmi et al. |
| 6,266,013 B1 | 7/2001 | Stilp et al. |
| 6,269,246 B1 | 7/2001 | Rao et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack |
| 6,388,618 B1 | 5/2002 | Stilp et al. |
| 6,393,294 B1 | 5/2002 | Perez-Breva et al. |
| 6,400,320 B1 | 6/2002 | Stilp et al. |
| 6,407,703 B1 | 6/2002 | Minter et al. |
| 6,449,486 B1 | 9/2002 | Rao |
| 6,463,290 B1 | 10/2002 | Stilp et al. |
| 6,470,195 B1 | 10/2002 | Meyer |
| 6,477,161 B1 | 11/2002 | Hudson |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,546,256 B1 | 4/2003 | Maloney |
| 6,553,322 B1 | 4/2003 | Ignagni |
| 6,563,460 B2 | 5/2003 | Stilp et al. |
| 6,571,082 B1 | 5/2003 | Rahman |
| 6,591,112 B1 | 7/2003 | Siccardo et al. |
| 6,603,428 B2 | 8/2003 | Stilp |
| 6,603,761 B1 | 8/2003 | Wang |
| 6,640,106 B2 | 10/2003 | Gutowski et al. |
| 6,646,604 B2 | 11/2003 | Anderson |
| 6,661,379 B2 | 12/2003 | Stilp et al. |
| 6,765,531 B2 | 7/2004 | Anderson |
| 6,771,625 B1 | 8/2004 | Beal |
| 6,771,969 B1 | 8/2004 | Chinoy |
| 6,782,264 B2 | 8/2004 | Anderson |
| 6,782,265 B2 | 8/2004 | Perez-Breva et al. |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,859,172 B2 | 2/2005 | Powers et al. |
| 6,871,077 B2 | 3/2005 | Kennedy, Jr. |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,944,465 B2 | 9/2005 | Spain et al. |
| 6,952,158 B2 | 10/2005 | Kennedy, Jr. |
| 6,987,979 B2 | 1/2006 | Carlsson |
| 6,996,392 B2 | 2/2006 | Anderson |
| 7,023,383 B2 | 4/2006 | Stilp et al. |
| 7,116,987 B2 | 10/2006 | Spain, Jr. et al. |
| 7,167,713 B2 | 1/2007 | Anderson |
| 7,167,714 B2 | 1/2007 | Dressler et al. |
| 7,233,799 B2 | 6/2007 | Spain, Jr. |
| 7,250,907 B2 | 7/2007 | Krumm et al. |
| 7,257,414 B2 | 8/2007 | Spain, Jr. et al. |
| 7,271,765 B2 | 9/2007 | Stilp et al. |
| 7,340,259 B2 | 3/2008 | Maloney |
| 7,383,051 B2 | 6/2008 | Spain, Jr. et al. |
| 7,427,952 B2 | 9/2008 | Bull et al. |
| 7,433,652 B2 | 10/2008 | Durgin |
| 7,433,695 B2 | 10/2008 | Gordon et al. |
| 7,440,762 B2 | 10/2008 | Maloney et al. |
| 7,460,505 B2 | 12/2008 | Spain |
| 7,593,738 B2 | 9/2009 | Anderson |
| 7,725,111 B2 | 5/2010 | Dressler et al. |
| 7,734,298 B2 | 6/2010 | Bhattacharya et al. |
| 7,753,278 B2 | 7/2010 | Spain, Jr. et al. |
| 7,796,966 B2 | 9/2010 | Bhattacharya et al. |
| 7,848,762 B2 | 12/2010 | Gordon et al. |
| 7,899,467 B2 | 3/2011 | Feuerstein et al. |
| 8,013,785 B2 | 9/2011 | Bhattacharya et al. |
| 8,068,802 B2 | 11/2011 | Bhattacharya et al. |
| 8,068,855 B2 | 11/2011 | Dressler et al. |
| 8,106,817 B2 | 1/2012 | Bhattacharya et al. |
| 8,106,818 B2 | 1/2012 | Bhattacharya et al. |
| 8,155,394 B2 | 4/2012 | Allegra et al. |
| 2002/0172223 A1 | 11/2002 | Stilp et al. |
| 2003/0064734 A1 | 4/2003 | Stilp et al. |
| 2003/0139188 A1 | 7/2003 | Chen et al. |
| 2003/0190919 A1 | 10/2003 | Niemenmaa |
| 2003/0203738 A1 | 10/2003 | Brown et al. |
| 2004/0043775 A1 | 3/2004 | Kennedy, Jr. et al. |
| 2004/0132466 A1 | 7/2004 | Kennedy, Jr. et al. |
| 2004/0203539 A1 | 10/2004 | Benes et al. |
| 2004/0203921 A1 | 10/2004 | Bromhead et al. |
| 2004/0218664 A1 | 11/2004 | Kennedy, Jr. et al. |
| 2004/0252752 A1 | 12/2004 | Kennedy, Jr. et al. |
| 2005/0058182 A1 | 3/2005 | Kennedy, Jr. et al. |
| 2005/0136945 A1 | 6/2005 | Kennedy, Jr. et al. |
| 2005/0164712 A1 | 7/2005 | Kennedy, Jr. et al. |
| 2005/0192026 A1 | 9/2005 | Carlson et al. |
| 2006/0003695 A1 | 1/2006 | Kennedy, Jr. et al. |
| 2006/0003775 A1 | 1/2006 | Bull et al. |
| 2006/0030333 A1 | 2/2006 | Ward et al. |
| 2006/0116130 A1 | 6/2006 | Kennedy, Jr. et al. |
| 2006/0125695 A1 | 6/2006 | Kennedy, Jr. et al. |
| 2006/0141998 A1 | 6/2006 | Kennedy, Jr. et al. |
| 2006/0154607 A1 | 7/2006 | Kennedy, Jr. et al. |
| 2006/0240836 A1 | 10/2006 | Kennedy, Jr. et al. |
| 2007/0087689 A1 | 4/2007 | Kennedy, Jr. et al. |
| 2007/0111746 A1 | 5/2007 | Anderson et al. |
| 2007/0155401 A1 | 7/2007 | Ward et al. |
| 2007/0155489 A1 | 7/2007 | Beckley et al. |
| 2007/0202885 A1 | 8/2007 | Kennedy, Jr. et al. |
| 2008/0132244 A1 | 6/2008 | Anderson et al. |
| 2008/0132247 A1 | 6/2008 | Anderson et al. |
| 2008/0137524 A1 | 6/2008 | Anderson et al. |
| 2008/0158059 A1 | 7/2008 | Bull et al. |
| 2008/0160952 A1 | 7/2008 | Bull et al. |
| 2008/0160953 A1 | 7/2008 | Mia et al. |
| 2008/0161015 A1 | 7/2008 | Maloney et al. |
| 2008/0248811 A1 | 10/2008 | Maloney et al. |
| 2008/0261611 A1 | 10/2008 | Mia et al. |
| 2008/0261612 A1 | 10/2008 | Mia et al. |

(56) References Cited

U.S. PATENT DOCUMENTS

| | | | |
|---|---|---|---|
| 2008/0261613 A1 | 10/2008 | Anderson et al. | |
| 2008/0261614 A1 | 10/2008 | Mia et al. | |
| 2009/0005061 A1 | 1/2009 | Ward et al. | |
| 2009/0124266 A1* | 5/2009 | Carlson et al. | 455/456.5 |

OTHER PUBLICATIONS

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

Y. Zhao, "Standardization of Mobile Phone Positioning for 3G Systems," IEEE Communications Magazine, Jul. 2002, pp. 108-116.

C. Drane, M. MacNaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam.pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

Amir Leshem, Mati Wax, "Array Calibration in the Presence of Multipath," IEEE Transactions on Signal Processing, vol. 48, No. 1, pp. 53-59, Jan. 2000.

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj, "Space-Time Signal Processing for Wireless Communications: A Survey", Information Systems Laboratory, Stanford University, Apr. 16-18, 1997, 4pgs.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N.J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

* cited by examiner

LTE USER EQUIPMENT POSITIONING SYSTEM AND METHOD

BACKGROUND

The location of a mobile, wireless or wired device is a useful and sometimes necessary part of many services. The precise methods used to determine location are generally dependent on the type of access network and the information that can be obtained from the device. For example, in wireless networks, a range of technologies may be applied for location determination, the most basic of which uses the location of the radio transmitter as an approximation.

Exemplary wireless networks may be a World Interoperability for Microwave Access ("WiMAX") network, a Long Term Evolution ("LTE") network, and the like. Generally, WiMAX is intended to reduce the barriers to widespread broadband access deployment with standards-compliant wireless solutions engineered to deliver ubiquitous fixed and mobile services such as VoIP, messaging, video, streaming media, and other IP traffic. LTE is generally a 4G wireless technology and is considered the next in line in the Global System for Mobile Communication ("GSM") evolution path after Universal Mobile Telecommunications System ("UMTS")/High-Speed Downlink Packet Access ("HSPDA") 3G technologies. LTE builds on the 3GPP family including GSM, General Packet Radio Service ("GPRS"), Enhanced Data Rate for Global Evolution ("EDGE"), Wideband Code Division Multiple Access ("WCDMA"), High Speed Packet Access ("HSPA"), etc., and is an all-IP standard like WiMAX. LTE is based on orthogonal frequency division multiplexing ("OFDM") Radio Access technology and multiple input multiple output ("MIMO") antenna technology. LTE provides higher data transmission rates while efficiently utilizing the spectrum thereby supporting a multitude of subscribers than is possible with pre-4G spectral frequencies. LTE is all-IP permitting applications such as real time voice, video, gaming, social networking and location-based services. LTE networks may also co-operate with circuit-switched legacy networks and result in a seamless network environment and signals may be exchanged between traditional networks, the new 4G network and the Internet seamlessly. While LTE protocol is being defined in the 3GPP standards as the next generation mobile broadband technology, there is a need for mobile subscriber or user equipment ("UE") location in LTE networks for compliance with the FCC E-911 requirements and for other location based services. The 3GPP standards have also identified different methods that could be used for positioning of an UE for an evolved-UMTS Terrestrial Radio Access Network ("E-UTRAN").

A number of applications currently exist within conventional communication systems, such as those supporting GSM, Time Division Multiple Access ("TDMA"), Code Division Multiple Access ("CDMA"), Orthogonal Frequency Division Multiple Access ("OFDMA") and UMTS technologies, for which location solutions are needed by mobile units, mobile stations, UE or other devices and by other entities in a wireless network. Examples of such applications may include, but are not limited to, GSM positioning and assisted global position system ("A-GPS") positioning. A-GPS adaptable UE may acquire and measure signals from a number of satellites to obtain an accurate estimate of the UE's current geographic position. GPS-based solutions may offer excellent accuracy, but GPS-based solutions generally suffer from yield issues in indoor environments or in environments that provide a poor line of sight to the open sky in which to best receive GPS satellite transmissions. Furthermore, embedding GPS chipsets into UE may also add an associated cost to the manufacturing of the UE and an associated cost to A-GPS functionality in the respective communications network. Further, some organizations are hesitant to offer a positioning method solely based upon the availability of a satellite network controlled by the United States government. There, however, exists a need in the art to locate UMTS, OFDMA or W-CDMA mobile devices to satisfy FCC E-911 regulations as well as to provide Location Based Services for mobile phone users.

The 3GPP UMTS standard outlines several methods for location including Cell-ID, Enhanced Cell-ID ("E-CID"), A-GPS, Observed Time Difference of Arrival ("OTDOA"), and Uplink Time Difference of Arrival ("U-TDOA"). Cell-ID generally is the simplest method which provides coarse positioning of mobile devices based on a known location of the coverage area centroid of each base station sector. Additionally, A-GPS is a straightforward implementation for network and handset manufacturers due to their legacy in CDMA2000 networks. Likewise, U-TDOA is also a straightforward technique for those skilled in the art and has been widely deployed for other air standards. OTDOA, on the other hand, is confronted with significant implementation challenges for network carriers, due to the fact that the base station timing relationships must be known, or measured, for this technique to be viable. For unsynchronized UMTS networks, where the base station timing is not locked to a common timing source, the 3GPP standard offers the suggestion that base station Location Measurement Units ("LMUs") or Network Synchronization Units ("NSUs") may be utilized to recover this timing information. Once the base station timing relationships are measured, the handset measurements of Observed Time Difference ("OTD") between various base stations may be translated into absolute ranges and range differences from which position can be calculated (e.g., through UE-based or UE-assisted methods).

The UMTS standard offers alternative location solutions for UE location. OTDOA technologies, with or without Idle Period Downlink ("IPDL"), have been developed and integrated into the UMTS standard as optional features to enable location of UEs. However, UMTS carriers have been reluctant to adopt these technologies because carriers had not initially requested these optional features in most UE devices. Additionally, concern may exist regarding the impact OTDOA may have on the operation of a communications network including call quality and network capacity. Because widespread adoption of OTDOA may require modifications in both the base stations and mobile stations, network providers are generally more interested in a solution that operates with existing mobile devices and base stations.

Some prior art systems are mobile appliance-based and determine the position of the mobile appliance by receiving multiple dedicated location signals either from components outside the mobile appliance's communication system, such as satellites and GPS systems or from a network of dedicated land-based antennas. Other prior art geolocation systems that are network overlay, or infrastructure-based, systems use combinations of specific, as opposed to ambiguous, measurements generally from multiple base stations, such as AOA, TOA and TDOA. These specific measurement values may be utilized to solve a set of mathematical equations to determine the location of the mobile appliance.

There is, however, a need in the art to obviate the deficiencies in the prior art and provide methods that use both uplink and downlink signal measurements in an exemplary communications network, such as, but not limited to, a UMTS, LTE network, etc. There is also a need in the art to provide measurements from downlink positioning methods and E-CID methods to determine UE positioning for both synchronous and asynchronous networks.

One embodiment of the present subject matter provides a method of determining the location of a mobile device in a communications network having a plurality of nodes. The method may include receiving observed positioning information for a mobile device from one or more nodes and determining downlink transmission time of a signal from the one or more nodes as a function of the received observed positioning information. Uplink positioning information from the mobile device may be received and a propagation delay determined between a node serving the mobile device and the mobile device as a function of the received uplink positioning information. Downlink timing information from the serving node may then be determined as a function of the determined downlink transmission time and the determined propagation delay. One or more ranges between additional nodes and the mobile device may be determined as a function of the determined downlink transmission time and the determined downlink timing information, and a location of the mobile device estimated as a function the determined one or more ranges and the determined propagation delay.

Another embodiment of the present subject matter may provide a method of determining the location of a mobile device in a communications network having a plurality of nodes, one of the plural nodes serving the device. The method may include receiving observed positioning measurements for a mobile device from the serving node and receiving uplink E-CID positioning measurements from the mobile device. One or more ranges may be determined between ones of the plural nodes and the mobile device as a function of the received observed positioning measurements and the received uplink E-CID positioning measurements, and a geographic location of the mobile device determined as a function the determined one or more ranges.

A further embodiment of the present subject matter provides a method of determining the location of a mobile device in a communications network having a plurality of nodes. The method may include receiving OTDOA measurements for a mobile device from one or more of the plural nodes and receiving uplink E-CID positioning measurements from the mobile device. One or more ranges may be determined between the plural nodes and the mobile device as a function of the received OTDOA measurements and received uplink E-CID positioning measurements. These determined ranges may be adjusted as a function of a metric, and a geographic location of the mobile device determined as a function the adjusted ranges.

These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

DETAILED DESCRIPTION

Figure 1A:
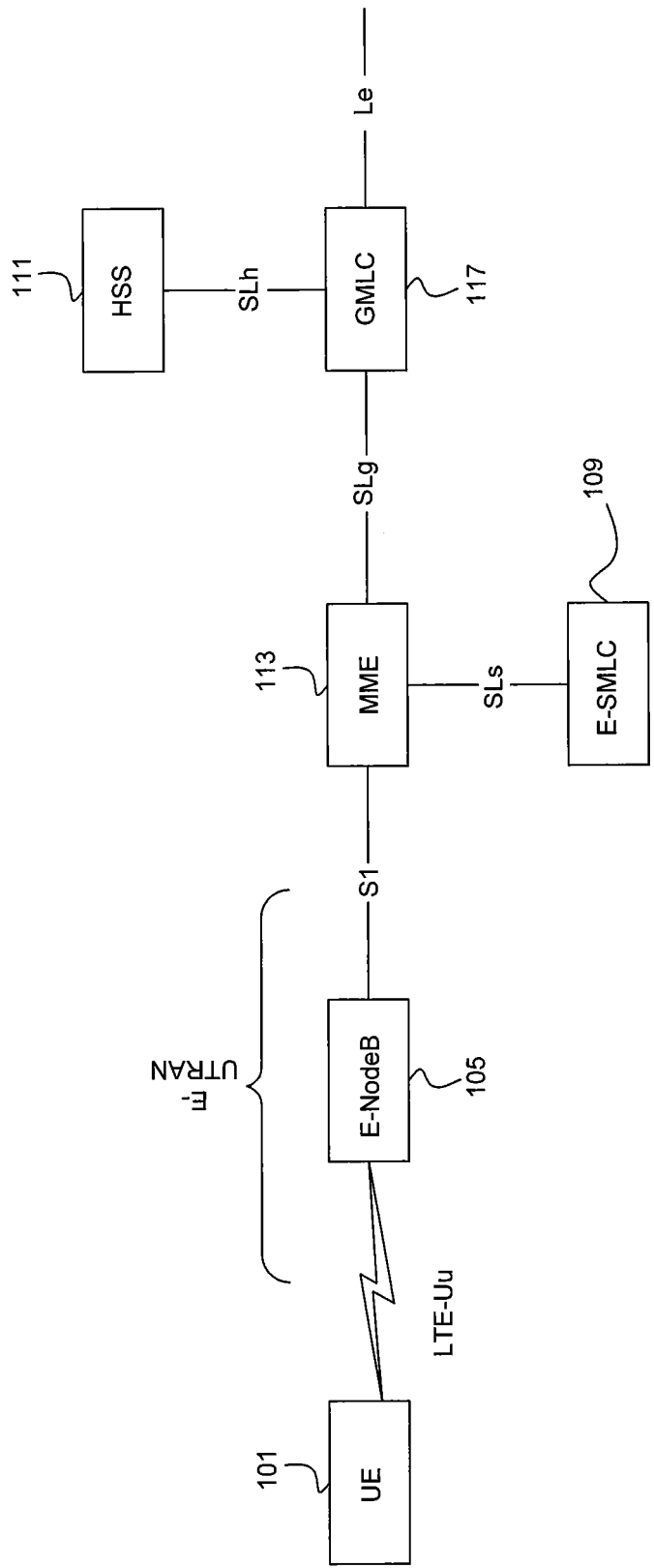
FIG. 1A is an illustration of an exemplary architectural diagram for CoPL.

With reference to the figures where like elements have been given like numerical designations to facilitate an understanding of the present subject matter, the various embodiments of an LTE user equipment positioning system and method are herein described.

As mobile networks transition towards 3G and beyond, location services (LCS, applications of which are sometimes referred to as Location Based Services, or LBS) have emerged as a vital service component enabled or provided by wireless communications networks. In addition to providing services conforming to government regulations such as wireless E911, LCS solutions also provide enhanced usability for mobile subscribers and revenue opportunities for network operators and service providers alike. The phrases subscriber station, mobile station, mobile appliance, wireless device, and user equipment ("UE") are used interchangeably throughout this document and such should not limit the scope of the claims appended herewith. Further, the terms station and device are also used interchangeably throughout this document and such should not limit the scope of the claims appended herewith.

The term "position" includes geographic coordinates, relative position, and derivatives such as velocity and acceleration. Although the term "position" is sometimes used to denote geographical position of an end-user while "location" is used to refer to the location within the network structure, these terms may often be used interchangeably without causing confusion. Common position measurement types used in mobile positioning or LCS include, but are not limited to, range, proximity, signal strength (such as path loss models or signal strength maps), round trip time, time of arrival, and angle of arrival. Multiple measurements can be combined, sometimes depending on which measurement types are available, to measure position. These combination approaches include, but are not limited to, radial (for example, employing multiple range measurements to solve for best agreement among circular loci), angle (for example, combining range and bearing using signal strength or round trip time), hyperbolic (for example, using multiple time-of-arrival), and real time differencing (for example, determining actual clock offsets between base stations).

Generally, LCS methods are accomplished through Control Plant ("CoP") or User Plane ("UP") methods. CoP Location ("CoPL") refers to using the control signaling channel within the network to provide location information of the subscriber or UE. UP Location ("UPL"), such as Secure User Plane Location ("SUPL") uses the user data channel to provide location information. CoPL location approaches include, but are not limited to, Angle-of-Arrival ("AOA"), Observed Time-Difference-of-Arrival ("OTDOA"), Observed-Time-Difference ("OTD"), Enhanced-OTD ("E-OTD"), Enhanced Cell-ID ("E-CID"), A-GPS, and A-GNSS. UPL approaches include, but are not limited to, A-GPS, A-GNSS, and E-CID, where this position data is communicated over IP.

There are two established architectures associated with location determination in modern cellular networks. These architectures are CoP and UP architectures. Typically, location requests are sent to a network through a query gateway function, and depending on the network implementation, CoP or UP may be used. The difference between user plane and control plane, generally, is that the former uses the communication bearer established with the device in order to communicate measurements. The latter uses the native signaling channels supported by the controlling network elements of the core and access to communicate measurements. For example, a CoPL solution supporting A-GPS would use its control plane signaling interfaces to communicate GPS data to/from the handset. Similarly UPL can conduct E-OTD, i.e., the handset takes the timing measurements but it communicates them to the location platform using the data bearer. UPL has the advantage of not depending on specific access technology to communicate measurement information. CoPL has the advantage that it can access and communicate measurements which may not be available to the device. Current models generally require network operators to deploy one or the other, CoPL or UPL. CoPL generally uses the native signaling plane of the network to establish sessions and communicate messages associated with location requests and to communicate measurements used for determining location. The control plane is the signaling infrastructure used for procedures such as call control, hand-off, registration, and authentication in a mobile network; CoPL uses this same infrastructure for performing location procedures. CoPL can utilize measurements made by both the control plane network elements as well as the end-user device being located.

FIG. 1A illustrates an exemplary architectural diagram of CoPL. A mobile station or mobile appliance 101 communication with an E-NodeB 105 via wireless interface LTE-Uu. A mobility management entity ("MME") 113 coordinates between the mobile appliance communication network and a gateway mobile location center ("GMLC") 117. In operation, a location measurement device (not shown) may be connected to the E-NodeB 105 and make measurements on the RF signals of the LTE-Uu interface, along with other measurements to support one or more of the position methods associated with the CoPL. Measurements from the location measurement units are sent to a serving mobile location center ("SMLC") or Evolved-SMLC ("E-SMLC") 109 where the location of a mobile appliance/UE 101 can be determined. The GMLC 117 may be connected to a home subscriber server ("HSS") 111 over an SLh interface.

Figure 1B:
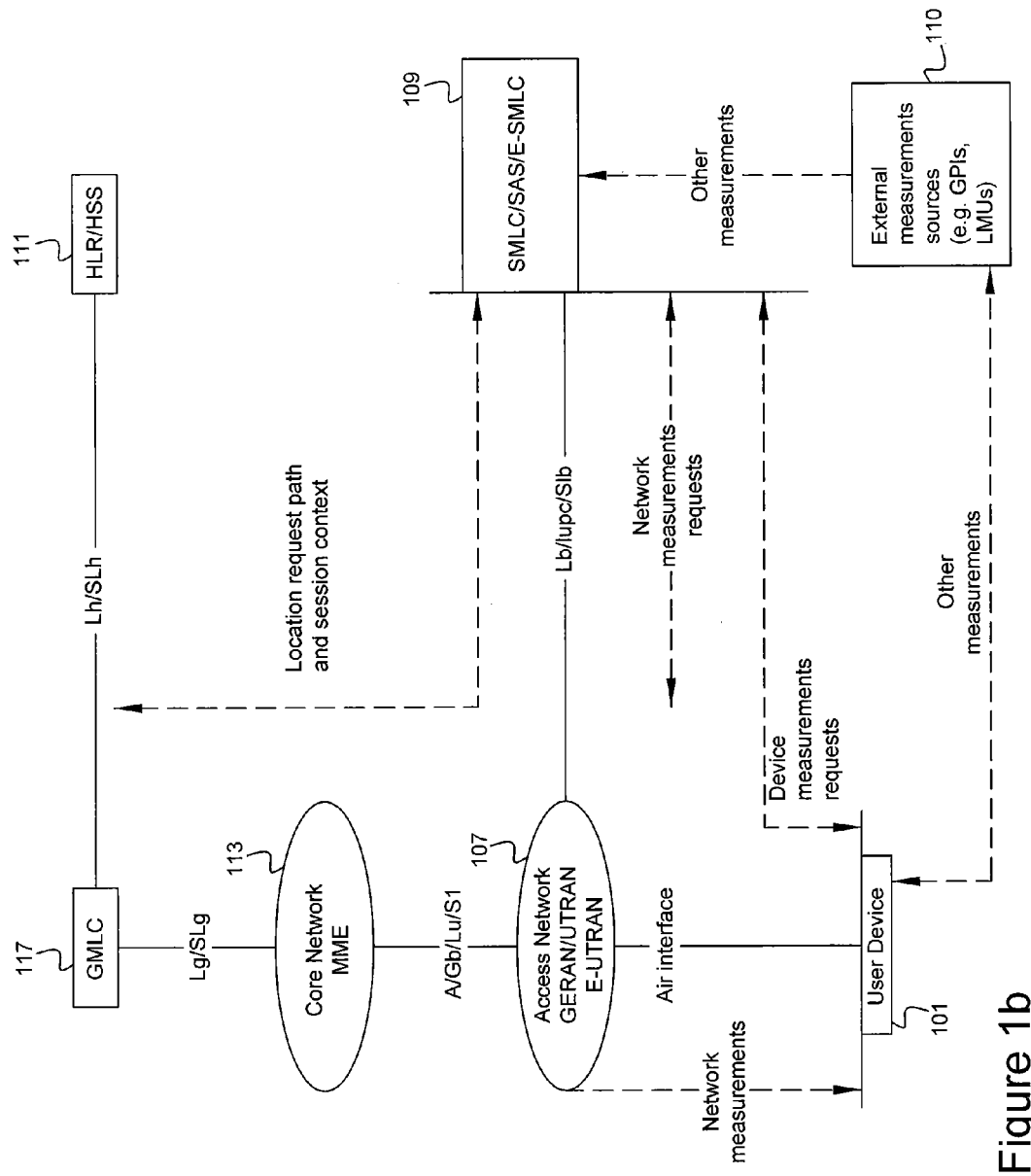
FIG. 1B is an illustration of the operation of an exemplary CoPL architecture.

The operation of a CoPL architecture is shown in FIG. 1B. This shows the 3GPP location services architecture. A gateway mobile location centre ("GMLC") 117 may be the network element that receives the location requests. The GMLC queries the HLR/HSS 111 over the Lh/SLh interface to find out which part of the access network 107 is currently serving the target device. The GMLC 117 sends a location request to the current serving core network node 113 via the Lg/SLg interface. The current serving core network node 113 (e.g., MME) then passes the request to the part of the access network 107 attached to the target device (e.g., GERAN BSC, UTRAN RNC or E-UTRAN RNC). This access network element 107 then invokes the facilities of the SMLC/SAS/E-SMLC 109. The location request session between the access network node 107 and the SMLC/SAS/E-SMLC 109 provides a channel by which the SMLC/SAS/E-SMLC 109 can ask for network measurements or to send messages to the end-user device 101 so that device measurement information can be exchanged. The SMLC/SAS/E-SMLC 109 may also obtain location measurement information from external devices 110 such as location measurement units ("LMUs") which take RF readings from the air interface. Similarly, the device may also take measurements from external systems, such as GPS satellites, and communicate these to the SMLC/SAS/E-SMLC 109.

The E-SMLC may generally be a serving location node defined by 3GPP and is analogous to the GERAN-SMLC and UTRAN-SAS. The E-SMLC hosts the position calculation functions and may be responsible for the overall coordination of a location request including selecting appropriate positioning technologies based on the requested quality of service (accuracy, response time), interacting with the mobile appliance and access network to serve assistance data and obtain appliance and network based measurements, providing the position calculation function, fallback positioning in case the primary location technique of choice fails, and generally assuring that a location result may be provided back to the tasking entity. Thus, the E-SMLC may generally support the interface to the MME in accordance with 3GPP protocol specifications, support multiple positioning technologies including Cell ID, E-CID, handset-based and handset-assisted A-GPS/A-GNSS, OTDOA, uplink timing LMU technology, AOA, and hybrid positioning in accordance with emerging standards and the demands of the market.

Developed as an alternative to CoPL, SUPL may generally be a set of standards managed by the Open Mobile Alliance ("OMA") to transfer assistance data and positioning data over IP to aid network and terminal-based positioning technologies in ascertaining the position of a SUPL Enabled Terminal ("SET"). UPL does not explicitly utilize the control plane infrastructure. Instead, UPL assumes that a data bearer plane may be available between the location platform and the end-user device. That is, a control plane infrastructure may have been involved in establishing the data bearer so that communication can occur with the device but no location-specific procedural signaling occurs over the control plane. As such, UPL may be limited to obtaining measurements directly from the end-user device itself.

Figure 2A:
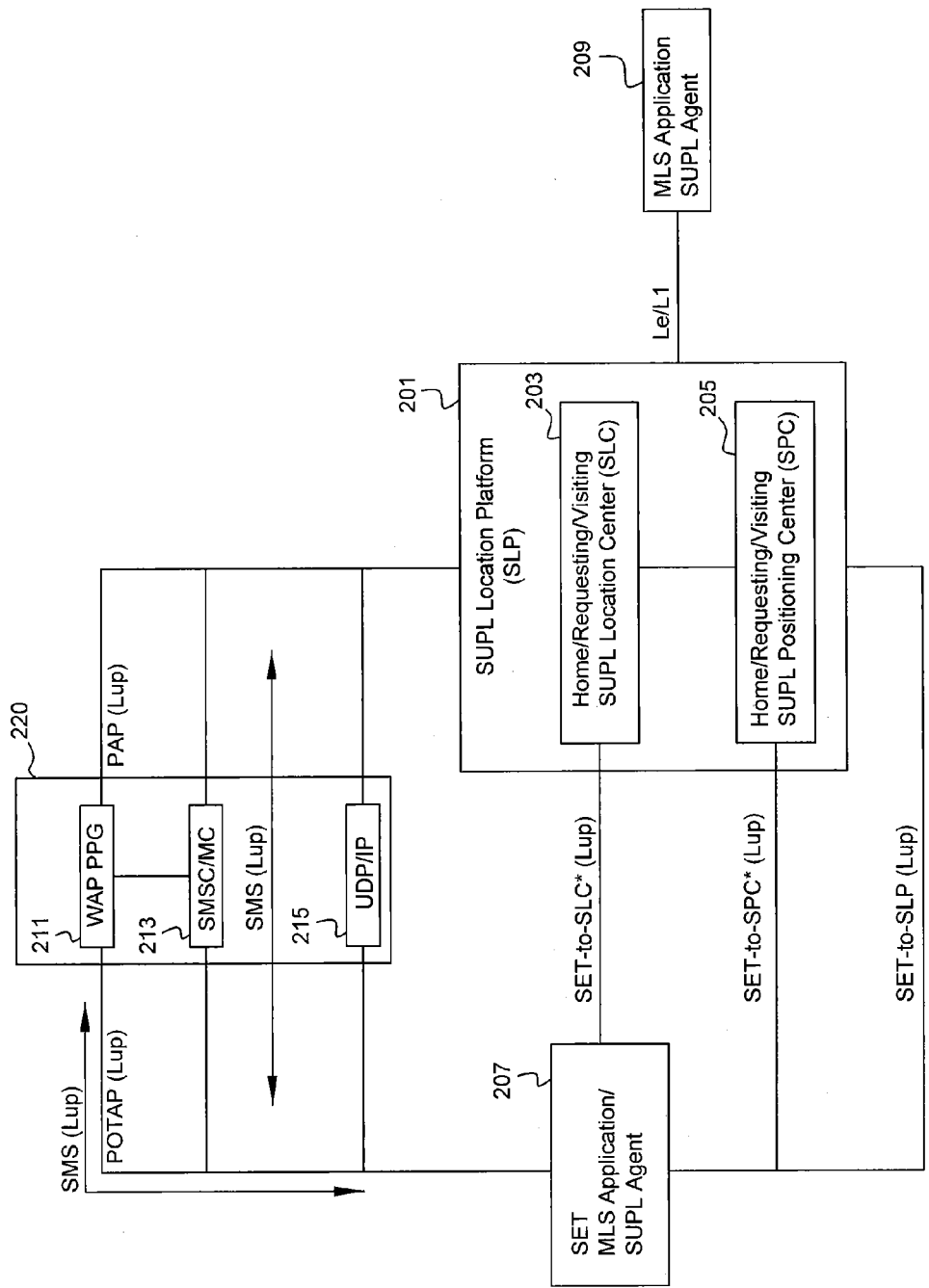
FIG. 2A is an illustration of an exemplary architectural diagram for SUPL.

SUPL includes a Lup reference point, the interface between the SUPL Location Platform ("SLP") and SET, as well as security, authentication, authorization, charging functions, roaming, and privacy functions. For determining position, SUPL generally implements A-GPS, A-GNSS, or similar technology to communicate location data to a designated network node over IP. FIG. 2A illustrates an exemplary architectural diagram for SUPL. The illustrated entities represent a group of functions, and not necessarily separate physical devices. In the SUPL architecture, an SLP 201 and SET 207 are provided. The SLP 201 may include a SUPL Location Center ("SLC") 203 and a SUPL Positioning Center ("SPC") 205. The SLC and SPC may optionally communicate over the Llp interface, for instance, when the SLC and SPC are deployed as separate entities. The SET 207 generally includes a mobile location services ("MLS") application, an application which requests and consumes location information, or a SUPL Agent, a service access point which accesses the network resources to obtain location information.

For any SET, an SLP 201 may perform the role of the home SLP ("H-SLP"), visited SLP ("V-SLP") or emergency SLP ("E-SLP"). An H-SLP for a SET includes the subscription, authentication, and privacy related data for the SET and may generally be associated with a part of the SET's home public land mobile network ("PLMN"). A V-SLP for a SET may be an SLP selected by an H-SLP or E-SLP to assist in positioning thereof and may be associated with or contained in the PLMN serving the SET. The E-SLP may perform positioning in association with emergency services initiated by the SET. The SLC 203 coordinates operations of SUPL in the network and interacts with the SET over the User Plane bearer to perform various functions including, but not limited to, privacy, initiation, security, roaming, charging, service management, and positioning calculation. The SPC 205 supports various functions including, but not limited to, security, assistance delivery, reference retrieval, and positioning calculation.

Figure 2B:
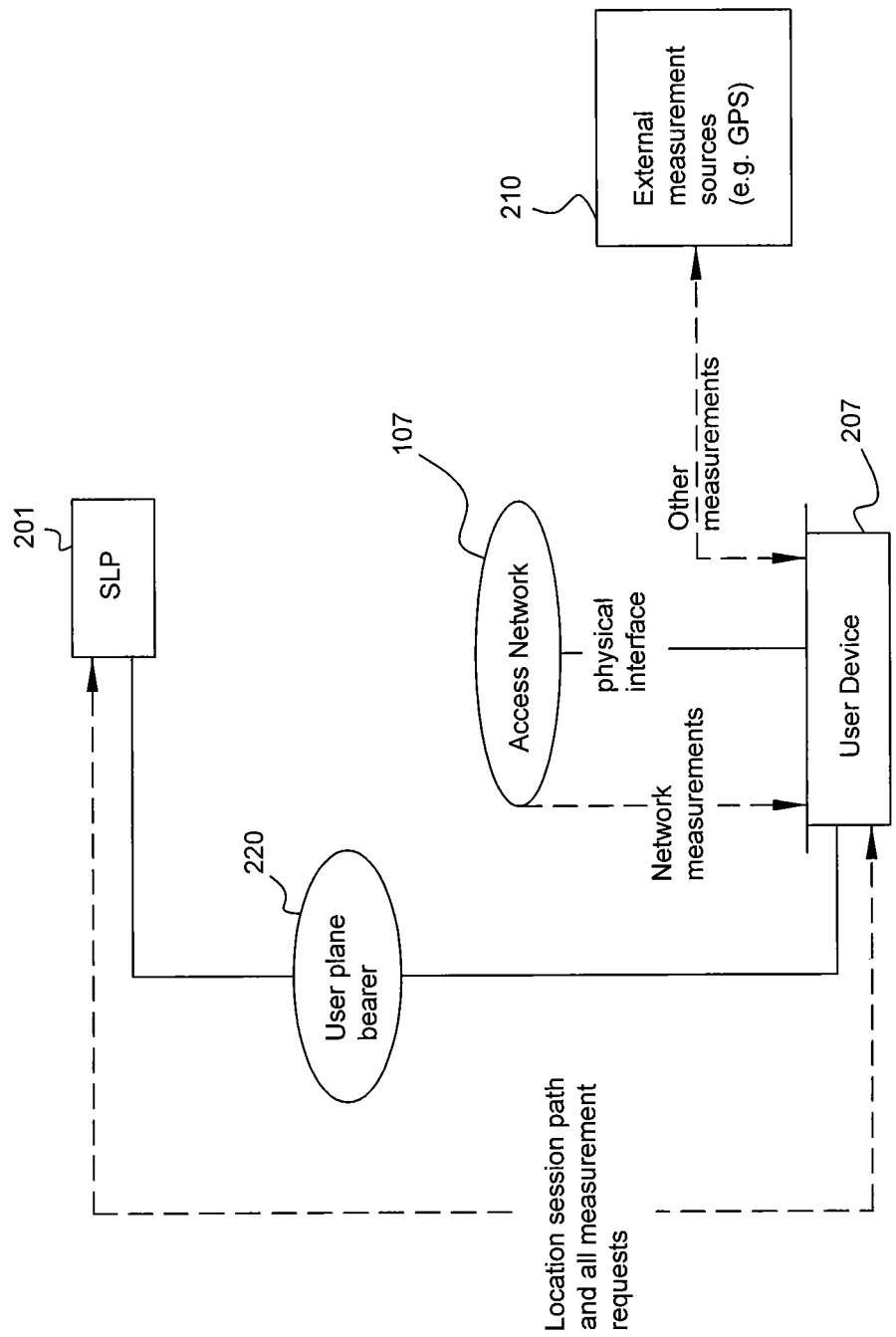
FIG. 2B is an illustration of the operation of an exemplary SUPL architecture.

SUPL session initiation may be network-initiated or SET-initiated. The SUPL architecture provides various alternatives for initiating and facilitating SUPL functions. For example, a SUPL Initiation Function ("SIF") may optionally be initiated using a Wireless Application Protocol Push Proxy Gateway ("WAP PPG") 211, a Short Message Service Center ("SMSC/MC") 213, or a User Datagram Protocol/Internet Protocol ("UDP/IP") 215 core, which forms user plane bearer 220. The operation of UPL is shown in FIG. 2B. Secure User Plane Location is a standard specification for UPL. Location requests come to the SLP 201 from external applications or from the end-user device itself. If a data session does not exist between the SLP 201 and the device 207 already, then the SLP 201 may initiate a request such that an IP session (user plane bearer 220) is established between the device 207 and the SLP 201. From then on, the SLP 201 may request measurement information from the device 207. The device may also take measurements from the network 107 or from external systems such as GPS 210. Because there may be no control plane connectivity to the network, the SLP 201 cannot directly request any measurement information from the network 107 itself. More information on SUPL, including the Secure User Plane Location Architecture documentation (OMA-AD-SUPL), can be readily obtained through OMA.

As discussed above, LTE may generally be directed toward a packet-optimized IP centric framework and is expected that voice calls will be transported through IP (e.g., VoIP) and location requests, e.g., E-911, etc., will also be serviced through the same or different IP. One non-limiting, supporting protocol for an exemplary LTE network, LTE Positioning Protocol ("LPP"), is in development and may be used by an exemplary node, e.g., E-SMLC, to communicate with a device or UE. LPP may be employed to retrieve UE capabilities, deliver assistance data, request measurement information, and/or to retrieve updated serving cell information.

Exemplary downlink positioning techniques and E-CID positioning techniques have been identified as candidates for UE positioning technology for E-UTRAN access. For example, in a downlink positioning technique, the position of a UE may be estimated based upon measurements taken at the UE of downlink radio signals from multiple nodes (e.g., eNodeBs, etc.), along with the knowledge of the geographical coordinates of the measured nodes and their relative downlink timing. In an E-CID positioning technique, knowledge of geographical coordinates of the serving node and additional UE/E-UTRAN radio resource measurements may be employed to estimate the position of a UE. Embodiments of the present subject matter may thus obtain an estimated position of a UE by combining measurements obtained from an exemplary E-CID process and measurements obtained from an exemplary OTDOA process and applying an exemplary Multiple Range Estimation Location ("MREL") technique thereto.

Figure 3:
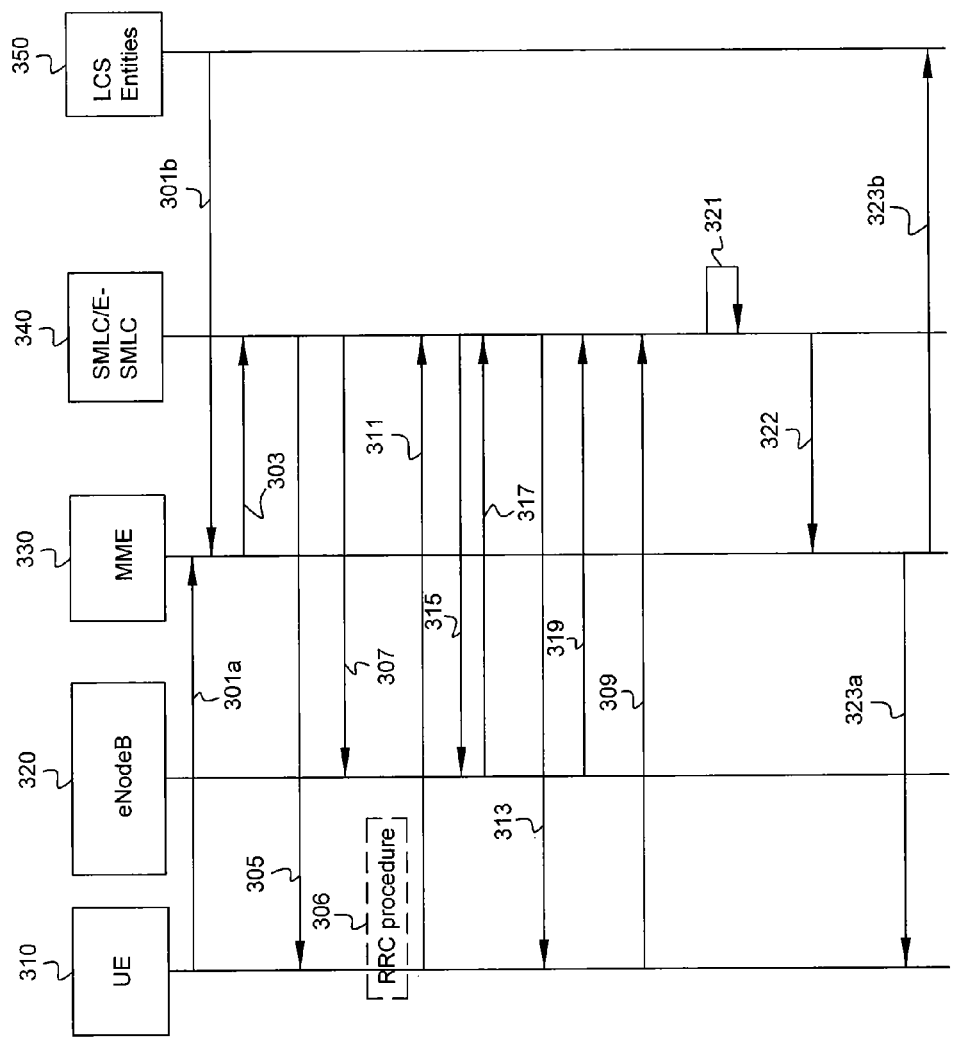
FIG. 3 is a sequence diagram of one embodiment of the present subject matter.

FIG. 3 is a sequence diagram of one embodiment of the present subject matter. With reference to FIG. 3, a Location Service Request may be provided by a UE 310 (UE or SET initiated) in step 301a or may be provided by a third party 350, such as but not limited to, an LCS entity, an Evolved Packet Core ("EPC") entity, or equivalents thereof, in step 301b. The Location Service Request may be provided directly to an SMLC/E-SMLC 340, or in the embodiment depicted in FIG. 3, the Location Service Request may be provided to a Mobility Management Entity ("MME") 330 which may then provide or transfer the Location Service Request to the SMLC/E-SMLC 340 in step 303. Thus, data may be passed through the MME 330 thereby using the MME 330 as a proxy server. Of course, the MME 330 provides additional functionality as a control-node for an exemplary LTE or SAE network. Generally, the MME 330 may be responsible for idle mode UE tracking and paging procedure including retransmissions as well as bearer activation/deactivation process among other functions. For example, the MME 330 may verify authorization of the UE 310 to camp on a service provider's Public Land Mobile Network ("PLMN"), may enforce UE roaming restrictions, provide control plane function for mobility between LTE and 2G/3G access networks, etc. Of course, as the respective network architecture may not be finalized yet, variations of the system embodied in FIG. 3 are envisioned and any claims appended herewith should not be so limited. For example, a location service request may also be initiated from the E-SMLC/SMLC 340 or other entity, and a similar procedure as described herein may be followed to obtain a location for the UE 310. Further, the eNodeB 320 may also function as an LCS client whereby the eNodeB 320 may deliver a Location Service Request to the SMLC/E-SMLC 340 via the MME 330.

With continued reference to FIG. 3, the SMLC/E-SMLC 340 may initiate location procedures with the UE 310 in step 305 to obtain a location estimate or positioning measurements or to transfer location assistance data to the UE 310. By way of a non-limiting example, the SMLC/E-SMLC 340 may transmit an LPP Request Location Information in step 305 to the UE 310 for location information such as, but not limited to, OTDOA measurements, E-CID information and measurements, etc. The SMLC/E-SMLC 340 may also initiate location procedures with the serving eNodeB 320 to obtain positioning measurements or assistance data at step 307. For example, the SMLC/E-SMLC 340 may transmit an LPPa E-CID Measurement Initiation Request to the eNodeB 320 in step 307. It should be noted that steps 305 and 307 may involve the utilization of different positioning methods to obtain location related measurements for a target UE 310 and from these measurements determine a location estimate and additional positional information; thus, the examples provided herein should not limit the scope of the claims appended herewith. For example, in step 305 the SMLC/E-SMLC 340 may send an LPP Request Location Information message to the UE 310 for invocation of a positioning method. This request may include positioning instructions such as the GNSS mode (UE-assisted, UE-based, etc.), positioning methods (GPS, Galileo, Glonass, downlink positioning, E-CID, etc.), specified UE measurements requested (fine time assistance measurements, velocity, etc.), and quality of service parameters (accuracy, response time). The UE 310 may perform the requested measurements and/or determine its location. The UE 310 may then transmit an LPP Provide Location Information message in step 309 to the SMLC/E-SMLC 340 containing any UE measurements available at the UE 310 (e.g., GNSS pseudoranges, downlink measurements, etc.). Further, in step 307 the LPPa E-CID Measurement Initiation Request may include an indication of the requested E-CID measurements and/or whether the result is expected once or periodically. If the SMLC/E-SMLC 340 in step 307 requested UE measurements or if the eNodeB 320 requires UE measurements associated with any measurements requested by the SMLC/E-SMLC 340, the eNodeB 320 may initiate Radio Resource Control ("RRC") procedures 306 to configure the UE 310 to report appropriate positioning measurements. In one embodiment, in response to the LPPa E-CID Measurement Initiation Request, the eNodeB 320 may provide an LPPa E-CID Measurement Initiation Response to the SMLC/E-SMLC 340 in step 319. This response may include the obtained E-CID measurements and/or other measurements from the UE 310.

In the embodiment illustrated in FIG. 3, the UE 310 may request assistance data from the SMLC/E-SMLC 340 in step 311. Of course, the SMLC/E-SMLC 340 may initiate assistance data delivery operations for the UE 310, if necessary, whereby the SMLC/E-SMLC 340 determines that assistance data needs to be provided to the UE 310 as a part of a positioning procedure and may send an LPP Provide Assistance Data message (in step 313) to the UE 310 that includes appropriate assistance data (e.g., downlink positioning assistance data, etc.). In one embodiment, in step 311 the UE 310 may determine that certain assistance data may be desired (e.g., downlink assistance data, etc.), and an LPP Request Assistance Data message may be sent to the SMLC/E-SMLC 340, the message including an indication of which assistance data are requested. Exemplary information may be, but are not limited to, downlink assistance data, additional information concerning the UE's approximate location and serving and neighbor cells, cell-IDs of the serving and/or neighbor eNodeBs, E-CID measurements, the last known location of the UE 310, etc. In step 313, the SMLC/E-SMLC 340 may provide the requested assistance data (whether the process is UE-initiated or otherwise) in an LPP Provide Assistance Data message.

The SMLC/E-SMLC 340 may also request assistance data in step 315 from the eNodeB 320. For example, the SMLC/E-SMLC 340 may determine that certain downlink positioning assistance data are desired and may send an LPPa OTDOA Information Request message to the eNodeB 320 in step 315. An exemplary message may include an indication of which specific downlink assistance data are requested. In response to the request, the eNodeB 320 may provide the requested assistance data in an LPPa OTDOA Information Response message in step 317.

With the downlink assistance information from the eNodeB 320 received, downlink OTDOA measurements from the UE acquired, and E-CID measurements acquired (made at the target UE and/or at the serving eNodeB), a location of the UE 310 may be determined employing an exemplary MREL technique at step 321. Exemplary MREL algorithms are described in co-pending U.S. application Ser. No. 12/292,821 filed Nov. 26, 2008 and Ser. No. 13/051,911 filed Mar. 18, 2011, the entirety of each being incorporated herein by reference. Upon determination of the location of the UE 310 in step 321, the SMLC/E-SMLC 340 may provide a Location Service Response to the MME 330 in step 322 and include any needed results, e.g., success or failure indication and, if requested and obtained, the location estimate of the UE 310. Depending upon whether the UE 310 transmitted a Location Service Request or another entity transmitted the Location Service Request, the MME 330 may return a Location Service Response to the UE 310 in step 323a or to the third party requester 350, such as an LCS Entity, in step 323b. An exemplary Location Service Response may include any needed results including, but not limited to, a location estimate for the UE 310.

Thus, embodiments of the present subject matter may obtain positioning measurements from the UE 310 and/or nodes in a network (e.g., serving eNodeB 420, neighboring eNodeB(s), etc.) as described above and discussed further in detail in 3GPP TS 36.305, 3GPP TS 36.455 and 3GPP TS 36.355, the entirety of each being incorporated herein by reference. Thus, the embodiment depicted in FIG. 3 serves only as a non-limiting example of the interaction between different nodes of an exemplary E-UTRAN network to obtain positioning measurements for the application of an exemplary MREL algorithm. As discussed above, the sequence of the procedure and some of the interaction may alter depending upon the nature and initiator of the Location Service Request; however, in one non-limiting embodiment of the present subject matter for an SMLC/E-SMLC 340 to determine the position of a UE 310, downlink assistance information from the eNodeB 320 may be acquired, downlink OTDOA measurements from the UE also acquired, and the E-CID measurements made at the target UE and/or at the serving eNodeB also acquired.

In one exemplary, non-limiting downlink positioning technique, an E-SMLC may receive OTDOA cell information from both the serving and reference nodes (e.g., eNodeB(s), etc.). This information may include the System Frame Number ("SFN") Initialization time that can be employed to determine an absolute downlink transmission time of a downlink frame at a transmission (Tx) antenna port through knowledge of the delay between the time stamping module and the Tx antenna port. Transmission time of the downlink frame $Tx\_enb_n$ at the Tx antenna port of nth eNodeB, may be represented by the following relationship:

$$Tx\_enb_n = SFN_n + \delta_n \quad (1)$$

where $SFN_n$ represents the SFN initialization time at the nth eNodeB and may be reported using assistance information from the nth eNodeB under the OTDOA cell Information Element, and $\delta_n$ represents the delay at the nth base station between the time stamping module and the Tx antenna port. Exemplary methods to determine δn are provided in co-pending U.S. Application No. 61/585,681, filed 12 Jan. 2012, the entirety of which is incorporated herein by reference.

In an exemplary, non-limiting uplink E-CID positioning technique, a node (e.g., an eNodeB) may obtain appropriate measurements, and the E-SMLC will receive the measurement results from the serving eNodeB including timing advance information of the target UE. As is known in the art, two types of timing advance information may be available from the eNodeB, Type 1, $T_{ADV_{type1}}$ and/or Type 2, $T_{ADV_{type2}}$.* In one embodiment, timing advance Type 1 may be employed to estimate the propagation delay between the UE and the serving eNodeB. For example, the propagation delay from the serving base station may be represented by the following relationship:

$$\hat{\tau}_0 = \frac{1}{2}(T_{ADV_{type1}}) \quad (2)$$

where $$T_{ADV_{type1}} = eNodeB\_TxRxTimeDiff + UE\_TxRxTimeDiff \quad (3)$$

and eNodeB_TxRxTimeDiff represents an uplink-downlink time difference measured at the eNodeB and UE_TxRxTimeDiff represents an uplink-downlink time difference measured at the UE.

Of course, in the absence of timing advance Type 1, timing advance Type 2 may be employed. In this embodiment, propagation delay from the serving base station may be represented by the following relationship:

$$\hat{\tau}_0 = \frac{1}{2}(T_{ADV_{type2}}) \quad (4)$$

Using the estimated value of $\hat{\tau}_0$ and the serving eNodeB downlink transmission time $Tx\_enb_0$, the received downlink SFN time at UE from the serving eNodeB $UERx_{enb_0}$ may be represented by the following relationship:

$$UERx_{enb_0} = Tx\_enb_0 + \hat{\tau}_0 \quad (5)$$

In an exemplary, non-limiting downlink OTDOA positioning technique, the UE may report Reference Signal Time Difference ("RSTD") or other measurements of the observed positioning reference signal ("PRS") subframe between the reference and neighboring eNodeB(s). This RSTD measurement may then be used to estimate the received downlink SFN time $UERx_{enb_n}$ at the UE from the nth eNodeB and may be represented by the following relationship:

$$UERx_{enb_n} = RSTD_{On} + UERx_{enb_0} - \Delta_{On} \quad (6)$$

where $$\Delta_{On} = SFN_n + \Delta_{PRS_n} - (SFN_0 + \Delta_{PRS_0}) \quad (7)$$

and where $\Delta_{PRS_n}$ represents PRS signal transmission offset at the nth base station as defined in ETSI TS 136.211, the entirety of which is incorporated herein by reference. PRS configurations may generally be available to an SMLC/E-SMLC from the assistance data information for OTDOA. With reference to Equation (6), it was assumed that the reference cell in the reported RSTD was the serving cell; however, in other embodiments, the reference cell may be a non-serving cell whereby if the reference cell is designated as r, the received downlink SFN time at the UE from the nth eNodeB may then be represented by the following relationship:

$$UERx_{enb_n} = RSTD_{rn} + UERx_{enb_r} - \Delta_{rn} \quad (8)$$

where $$UERx_{enb_r} = RSTD_{r0} + UERx_{enb_0} - \Delta_{r0} \quad (9)$$

and $$\Delta_{rn} = SFN_n + \Delta_{PRS_n} - (SFN_r + \Delta_{PRS_r}) \quad (10)$$

The propagation delay from the nth non-serving cell or base station can then be represented by the following relationship:

$$\tau_n = Tx\_enb_n - UERx_{enb_n} \quad (11)$$

where $Tx\_enb_n$ and $UERx_{enb_n}$ may be determined as described above. Thus, the nth range ring corresponding to the nth eNodeB can be determined using the following relationship:

$$\hat{R}_n = \hat{\tau}_n \times c \quad (12)$$

where the constant c represents the speed of light. It should be noted that the accuracy and precision of the respective delay or range from the base station may depend upon the accuracy and precision of the SFN timestamp, the timing advance value, and RSTD.

The noise in each of the estimated range rings in equation (12) may include a statistical distribution, or a variance, dependent upon variances of the noise in the timing measurements in equations (3), (6) and (11). This variance can be derived as a function of, but not limited to, the following parameters, serving and neighboring sites' downlink signal strength indicators reported in E-CID measurement results from the target UE or the serving eNodeB, such as the Reference Signal Received Power (RSRP) or Reference Signal Received Quality (RSRQ), received UE uplink signal strength indicators, such as RSRP and RSRQ, the value of Ue_RxTxTimeDiff, the inter site distance of eNodeB(s), topography, terrain of the region of UE, and combinations thereof.

Therefore, timing measurement variances such as $\sigma_{enb_0RxTxDiff}^2$, which represents a variance of an eNodeB_TxRxTimeDiff measurement, $\sigma_{UERxTxDiff}^2$, which represents a variance of a UE_TxRxTimeDiff measurement, and $\sigma_{RSTD_{oi}}^2$, which represents a variance of the $RSTD_{0i}$ measurement, may be provided by the relationships below:

$$\sigma_{enb_0RxTxDiff}^2 = f(\text{uplink signal strength at UE, inter site distance or UE}_{RxTxTimeDiff}\text{ measurements}) \quad (13)$$

$$\sigma_{UERxTxDiff}^2 = f(\text{down link signal strength at UE, inter site distance or UE}_{RxTxTimeDiff}\text{ measurements}) \quad (14)$$

$$\sigma_{RSTD_{0i}}^2 = f(\text{down link signal strength at UE, inter site distance or UE}_{RxTxTimeDiff}\text{ measurements}) \quad (15)$$

where $f(.)$ represents a function of the parameters described within the parentheses.

The estimated ranges or range rings determined above may be employed for location estimation using any exemplary MREL technique described in co-pending U.S. application Ser. No. 12/292,821 filed Nov. 26, 2008 and Ser. No. 13/051,911 filed Mar. 18, 2011, the entirety of each being incorporated herein by reference. For example, given a set of nodes a set of ranges or range rings can be produced which define the propagation times from the UE to a set of nodes. An intersection of the range rings may provide the location of the UE. Of course, range rings need not be determined at each node. In one embodiment, a covariance matrix C of the ranges or range rings may provide statistical properties that can be used in a location technique. The elements of this matrix may be expressed in terms of the variance of the eNodeB_RxTxTimeDiff measurement given by $\sigma_{enb_0RxTxDiff}^2$, the variance of the UE_RxTxTimeDiff measurement given by $\sigma_{UERxTxDiff}^2$, and the variance of the $RSTD_{oi}$ measurement at non-serving nodes is given by $\sigma_{RTSD_{0i}}^2$. These relationships may assume that the measurements are disturbed by additive noise that is independent from node to node and the UE to serving node. The diagonal terms of the covariance matrix C are provided by the serving range ring variance $$\frac{1}{4}\sigma_{enb_0RxTxDiff}^2 + \frac{1}{4}\sigma_{UERxTxDiff}^2$$

in the (1, 1) position and the individual non-serving range ring variances $$\sigma_{RSTD_{0i}}^2 + \frac{1}{4}\sigma_{enb_0RxTxDiff}^2 + \frac{1}{4}\sigma_{UERxTxDiff}^2$$

in the (k, k) positions, where k=2, 3, . . . n. The terms alone the first row and column, the terms in the (1, k) and (k, 1) positions, are given by $$-\frac{1}{4}\sigma^2_{enb_0 RxTxDiff} - \frac{1}{4}\sigma^2_{UERxTxDiff}$$

The mutual covariance terms between distinct non-serving range rings, the terms in the positions (k,j) where j≠k; j≠1, are given by $$\frac{1}{4}\sigma^2_{enb_0 RxTxDiff} + \frac{1}{4}\sigma^2_{UERxTxDiff}.$$

It may be observed that this defines a matrix with a lack of symmetry between the serving range ring and other non-serving range rings. This is to be expected from the form of the equations, particularly noting how the UE transmission time is generated. The serving range ring properties are therefore dominant in this matrix.

It is important to note that the variance for each range ring may be different in the MREL method. That is, there may be a different variance for each individual timing measurement. When clear Line Of Sight (LOS) signal paths exist between a transmitter and a set of receivers, it is expected that the multipath component in the signal propagation is quite small. In a situation where multiple instances of range rings can be obtained over a short time interval within which the UE cannot move an appreciable distance, the best estimate of any particular range ring may be obtained by some means. For example, the median range ring for a given UE-node pair may be taken as the representative range ring for that pair. Alternatively, the representative range ring may be taken by clustering the available set of range rings for this UE-node pair and using the cluster with smallest distance. In any case, the final set of range rings has a single range ring for each UE-node pair. Note that if two or more tight clusters occur, it is possible to provide multiple range rings for a given UE-node pair.

Thus, a set of range rings may be represented by R where $$R = \begin{bmatrix} R_1 \\ R_2 \\ \ldots \\ R_k \end{bmatrix} \quad (16)$$

where k represents the number of geographically separated nodes observing the UE.

Let S denote the region over which the device may be located. This region could, for example, be the region enclosed by the set of nodes or some expansion of this basic region. Now, for each point (x,y) in the region let $D_i(x,y)$ denote the distance from the point (x,y) to $i^{th}$ the node. Now let $$D = \begin{bmatrix} D_1(x,y) \\ D_2(x,y) \\ \ldots \\ D_k(x,y) \end{bmatrix} \quad (17)$$

Let α be a real number. Then assuming Gaussian noise as the disturbance on the range rings measurements, it can be shown that the optimum location for the device may be written as the location $(\hat{x}, \hat{y})$ such that the quantity $$[R-A-D]^{H} * C^{-1} * [R-A-D] \quad (18)$$

in which the vector A is a vector of equal values in each position is written as $$A = \begin{bmatrix} \alpha \\ \alpha \\ \ldots \\ \alpha \end{bmatrix} \quad (19)$$

is minimized and where the minimization is over all points (x,y) in the region S and over all real α.

A highly simplified version of this, where we only consider the diagonal elements of the covariance matrix may be considered. The understanding is that in actual application one should consider both the optimal solution and the simplified presentations, shown here primarily for ease of exposition of the principles involved. With this simplification, let α be a real number. Then the optimal location for the UE can be determined as the location $(\hat{x}, \hat{y})$ such that the vector norm given by $$\|R-A-D\| \quad (20)$$

An understanding of the process applied here can be obtained by considering some fundamental issues associated with LOS propagation and range ring accuracy. First, it should be noted that the ranges or range rings obtained as described in the previous section could have some uncertainty associated with them due to even a small error in estimating the transmission time at the UE. The parameter α is used to permit correction of this effect and compensating for multipath in the serving node to UE path among others. Second, once these measurement inaccuracies have been addressed, the remaining error on the range rings is assumed to be Gaussian noise for the ideal case of LOS signals. This noise is statistically limited by other quantities such as the power level of the signal, and is generally small. For example in the GSM protocol the associated error is of the order of a few tens of meters.

This minimization in equation can also be expressed as $$\min \Sigma\{(R_i-\alpha-D_i)^2\} \quad (21)$$

where i indexes the particular range ring (or the node associated with that range ring). In addition if each range ring is assigned a weight $w_i$, the minimization can be written as $$\min \Sigma\{w_i(R_i-\alpha-D_i)^2\} \quad (22)$$

An example of such a weight is the inverse of the variance of the range or range ring measurements that were used to generate that particular range ring. Another example may be a measure of the overall quality of the measurements that generated this range ring. In addition, the range of α may be limited. In one case α is unrestricted; that is it is allowed to take any real value. In another case, α is limited in a manner defined by several factors including the wireless protocol being used, the type of terrain being considered, etc.

Figure 4A:
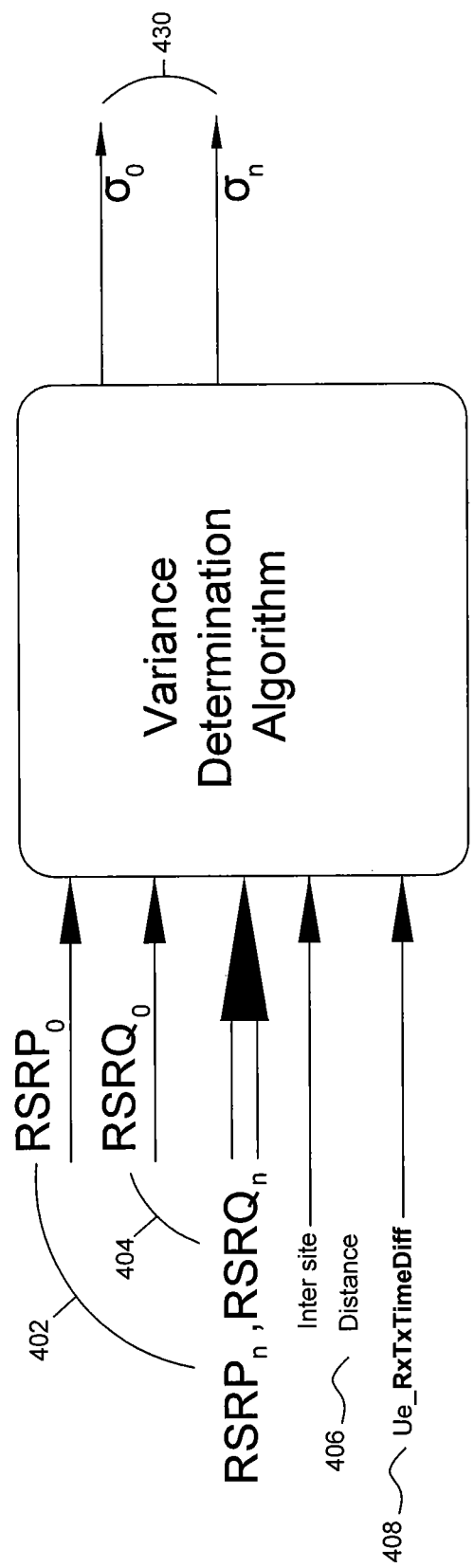
FIGS. 4a and 4b are diagrams of embodiments of the present subject matter.
Figure 4B:
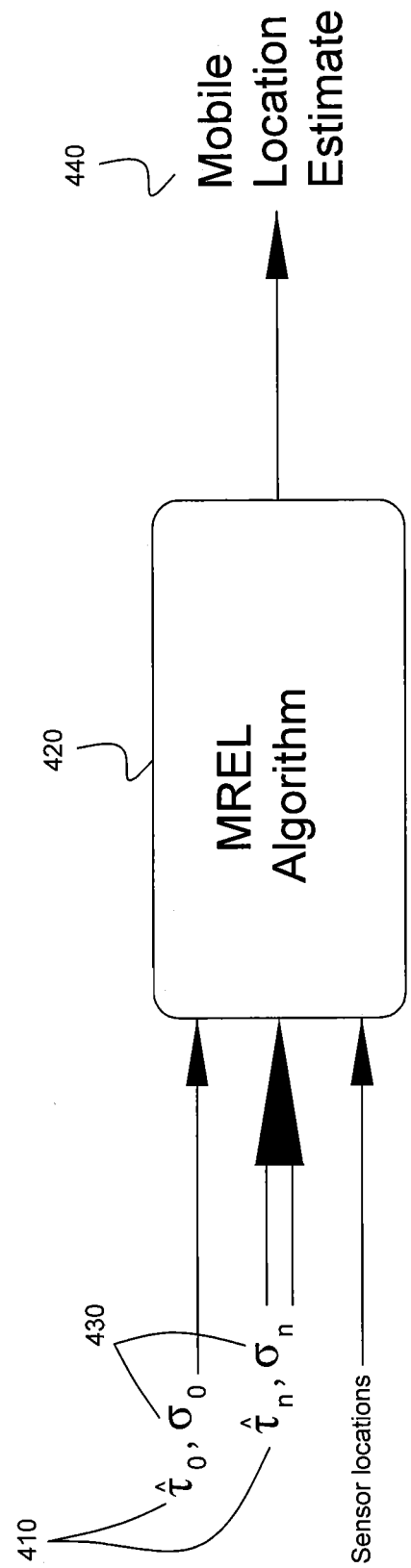

FIGS. 4a and 4b provide simplified diagrams of embodiments of the present subject matter. With reference to FIG. 4a, each range or range ring from an eNodeB may be assigned a statistical distribution $\sigma_n$ or variance $\sigma_0$ 430 based upon measured downlink signal strength at the UE, UE_RxTxTimeDiff value 408, inter site distance of eNodeB(s) 406, and/or topography or terrain of the region of UE. The downlink signal strength may be determined from the Reference Signal Received Power (RSRP) 402 or Reference Signal Received Quality (RSRQ) 404 as reported in the E-CID measurement results reported from either from the target UE or the serving eNodeB. With reference to FIG. 4b, the estimated ranges 410 from the serving eNodeB $\hat{\tau}_0$ and $\hat{\tau}_n$ from neighboring eNodeB(s) may be employed in an exemplary MREL algorithm 420 along with the determined variance 430 of the ranges for the serving eNodeB $\sigma_0$ and/or for the neighboring eNodeB(s) $\sigma_n$ to estimate a location 440 of the target UE or mobile device.

Figure 5:
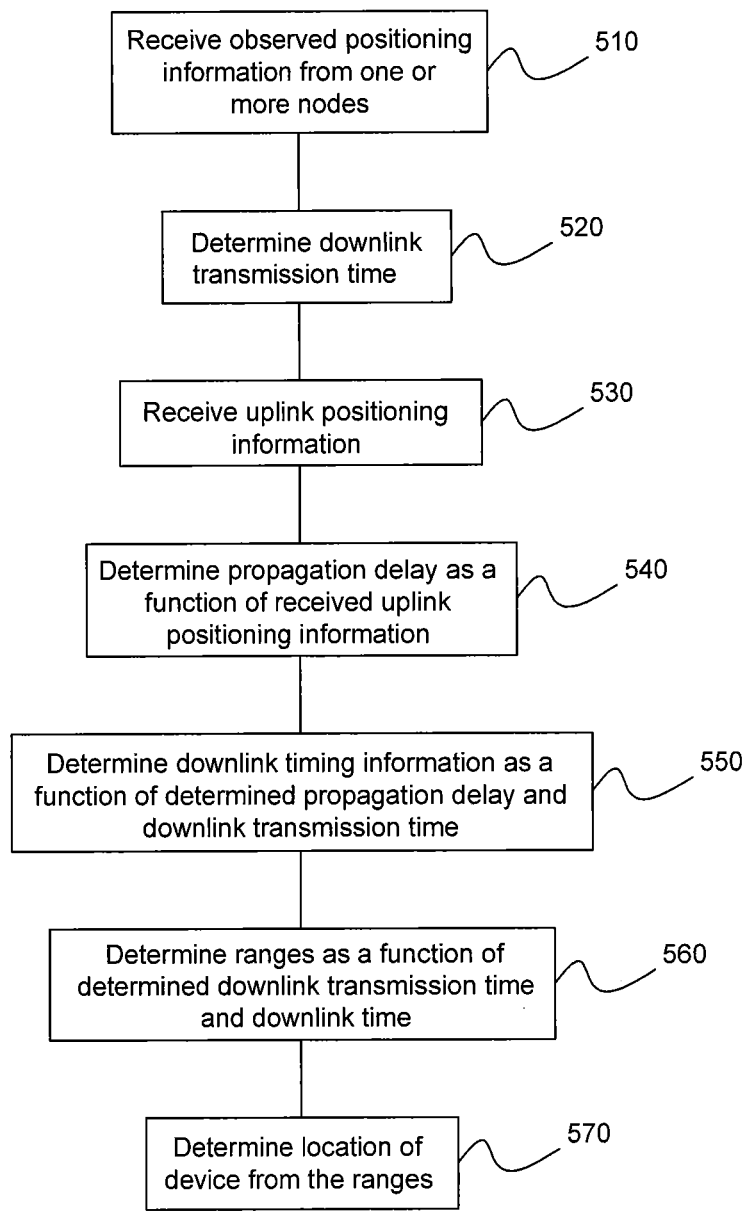
FIG. 5 is a diagram of one embodiment of the present subject matter.

FIG. 5 is a diagram of one embodiment of the present subject matter. With reference to FIG. 5, a method 500 is provided for determining the location of a mobile device in a communications network having a plurality of nodes. The method may include at step 510 receiving observed positioning information for a mobile device from one or more nodes and at step 520 determining downlink transmission time of a signal from the one or more nodes as a function of the received observed positioning information. The mobile device and the one or more nodes may be synchronized or unsynchronized. In one embodiment, the received observed positioning information may be received from a serving eNodeB and a reference eNodeB or a serving base station and a reference station. Of course, these nodes may be eNodeBs or base stations not in active communication with the mobile device. In another embodiment, the observed positioning information may include System Frame Number initialization time. Other exemplary observed positioning information may include, but is not limited to, power levels, power differences, functions defined by power levels, functions defined by power differences, serving cell, serving sector, Timing Advances, Timing Advance equivalents, an ordered list of signal sources, round trip time, time difference of arrival, power density function of power levels, joint power density function of power levels, mobile device orientation, network state reported by the network, network state determined by an observing device, and combinations thereof. The downlink transmission time, in step 520, may be determined using the relationship: $Tx\_enb_n = SFN_n - \delta_n$, where $Tx\_enb_n$ represents transmission time of a downlink frame at a transceiver antenna port of an $n^{th}$ node, $SFN_n$ represents System Frame Number initialization time at the $n^{th}$ node, and $\delta_n$ represents delay at the $n^{th}$ node.

At step 530, uplink positioning information may be received from the mobile device, and at step 540 a propagation delay between a node serving the mobile device and the mobile device determined as a function of the received uplink positioning information. In one embodiment, the uplink positioning information includes timing advance information of a signal transmitted from the mobile device such as, but not limited to, timing advance type 1 or timing advance type 2. At step 550, downlink timing information from the serving node may be determined as a function of the determined downlink transmission time and the determined propagation delay. In one embodiment, the determined downlink timing information may be adjusted as a function of an observed positioning reference signal between a reference and neighboring nodes.

Further, at step 560, one or more ranges between additional nodes and the mobile device may be determined as a function of the determined downlink transmission time and the determined downlink timing information. At step 570, a location of the mobile device may be determined as a function the determined one or more ranges and the determined propagation delay. In one embodiment, step 570 may further include adjusting each determined range and adjusting the determined propagation delay to determine the location of the mobile device. This adjustment of each range may be approximately the same amount or different. Further, the adjustment of each determined range and the adjustment of the determined propagation delay may be different or the same amount. In another embodiment, this adjustment of each determined range and adjustment of the determined propagation delay may include adjusting each range and the propagation delay as a function of a value selected from a downlink signal strength, UE Rx-Tx time difference, distance values between nodes, topography of the network, terrain, reference received signal power, reference signal quality, presence of multipath, and combinations thereof.

Figure 6:
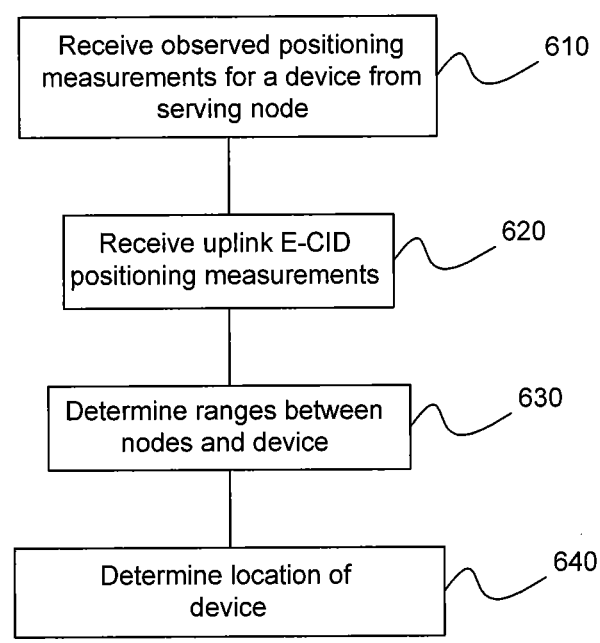
FIG. 6 is a diagram of another embodiment of the present subject matter.

FIG. 6 is a diagram of another embodiment of the present subject matter. With reference to FIG. 6, a method 600 is provided for determining the location of a mobile device in a communications network having a plurality of nodes. The method may include at step 610 receiving observed positioning measurements for a mobile device from the serving node, and at step 620 receiving uplink E-CID positioning measurements from the mobile device. In one embodiment, step 610 may include determining downlink transmission time of a signal from the serving node as a function of the received observed positioning measurements. Exemplary observed positioning information may include, but is not limited to, SFN initialization time, power levels, power differences, functions defined by power levels, functions defined by power differences, serving cell, serving sector, Timing Advances, Timing Advance equivalents, an ordered list of signal sources, round trip time, time difference of arrival, power density function of power levels, joint power density function of power levels, mobile device orientation, network state reported by the network, network state determined by an observing device, and combinations thereof.

In another embodiment, step 620 may include determining a propagation delay between the serving node and the mobile device as a function of the received uplink E-CID positioning measurements, and determining downlink timing information from the serving node as a function of the determined propagation delay. These uplink E-CID positioning measurements may, in an embodiment, include timing advance information of a signal transmitted from the mobile device. At step 630, one or more ranges may be determined between ones of the plural nodes and the mobile device as a function of the received observed positioning measurements and the received uplink E-CID positioning measurements. At step 640, a geographic location of the mobile device may be determined as a function the determined one or more ranges. In an alternative embodiment, step 640 may include adjusting each determined range to determine the geographic location of the mobile device. These adjustments may be different or may be approximately the same amount.

Figure 7:
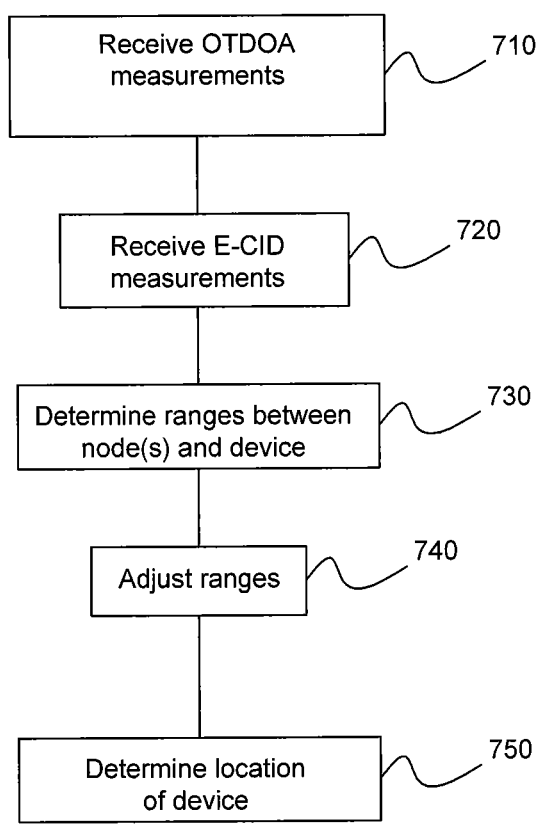
FIG. 7 is a diagram of a further embodiment of the present subject matter.

FIG. 7 is a diagram of a further embodiment of the present subject matter. With reference to FIG. 7, a method 700 is provided for determining the location of a mobile device in a communications network having a plurality of nodes. The method may include at step 710 receiving OTDOA measurements for a mobile device from one or more of the plural nodes and, at step 720 receiving uplink E-CID positioning measurements from the mobile device. At step 730, one or more ranges may be determined between the plural nodes and the mobile device as a function of the received OTDOA measurements and received uplink E-CID positioning measurements. In one embodiment, the E-CID positioning measurements may include timing advance information of a signal transmitted from the mobile device. At step 740, each determined range may be adjusted as a function of a metric, and at step 750 a geographic location of the mobile device determined as a function the adjusted ranges. The adjustment of each range may be approximately the same amount or may be different. In one embodiment, the metric in step 740 may be determined as a function of a value such as, but not limited to, a downlink signal strength, UE Rx-Tx time difference, distance values between nodes, topography of the network, terrain, signal power, signal quality, presence of multipath, and combinations thereof.

The present disclosure may be implemented by a general purpose computer programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms data memory including non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the claimed subject matter, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As shown by the various configurations and embodiments illustrated in FIGS. 1-7, an LTE user equipment positioning system and method have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method of determining the location of a mobile device in a communications network having a plurality of nodes comprising the steps of:
   (a) receiving observed positioning information for a mobile device from one or more nodes;
   (b) determining downlink transmission time of a signal from the one or more nodes as a function of the received observed positioning information;
   (c) receiving uplink positioning information from the mobile device;
   (d) determining a propagation delay between a node serving the mobile device and the mobile device as a function of the received uplink positioning information;
   (e) determining downlink timing information from the serving node as a function of the determined downlink transmission time and the determined propagation delay;
   (f) determining one or more ranges between additional nodes and the mobile device as a function of the determined downlink transmission time and the determined downlink timing information; and
   (g) determining a location of the mobile device as a function the determined one or more ranges and the determined propagation delay.

2. The method of claim 1 wherein the received observed positioning information is received from a serving eNodeB and a reference eNodeB or a serving base station and a reference station.

3. The method of claim 1 wherein the additional nodes are eNodeBs or base stations not in active communication with the mobile device.

4. The method of claim 1 wherein the observed positioning information includes System Frame Number initialization time.

5. The method of claim 1 wherein the downlink transmission time is determined using the relationship: $Tx\_enb_n = SFN_n - \delta_n$, where $Tx\_enb_n$ represents transmission time of a downlink frame at a transceiver antenna port of an $n^{th}$ node, $SFN_n$ represents System Frame Number initialization time at the $n^{th}$ node, and $\delta_n$ represents delay at the $n^{th}$ node.

6. The method of claim 1 wherein the uplink positioning information includes timing advance information of a signal transmitted from the mobile device.

7. The method of claim 6 wherein the timing advance information is timing advance type 1 or timing advance type 2.

8. The method of claim 1 further comprising the step of adjusting the determined downlink timing information as a function of an observed positioning reference signal between a reference and neighboring nodes.

9. The method of claim 1 wherein the step of determining a location of the mobile device further comprises adjusting each determined range and adjusting the determined propagation delay to determine the location of the mobile device.

10. The method of claim 9 wherein the adjustment of each range is approximately the same amount.

11. The method of claim 9 wherein the step of adjusting each determined range and adjusting the determined propagation delay includes adjusting each range and the propagation delay as a function of a value selected from the group consisting of: downlink signal strength, UE Rx–Tx time difference, distance values between nodes, topography of the network, terrain, reference received signal power, reference signal quality, presence of multipath, and combinations thereof.

12. The method of claim 9 wherein the adjustment of each determined range and the adjustment of the determined propagation delay are different.

13. The method of claim 1 wherein the mobile device and the one or more nodes are synchronized.

14. A method of determining the location of a mobile device in a communications network having a plurality of nodes, one of the plural nodes serving the device comprising the steps of:
   (a) receiving observed positioning measurements for a mobile device from the serving node;
   (b) receiving uplink enhanced cell identification (E-CID) positioning measurements from the mobile device;
   (c) determining one or more ranges between ones of the plural nodes and the mobile device as a function of the received observed positioning measurements and the received uplink E-CID positioning measurements; and
   (d) determining a geographic location of the mobile device as a function the determined one or more ranges.

15. The method of claim 14 wherein the step of receiving observed positioning measurements further comprises determining downlink transmission time of a signal from the serving node as a function of the received observed positioning measurements.

16. The method of claim 14 wherein the step of receiving uplink E-CID positioning measurements further comprises:
   determining a propagation delay between the serving node and the mobile device as a function of the received uplink E-CID positioning measurements; and
   determining downlink timing information from the serving node as a function of the determined propagation delay.

17. The method of claim 16 wherein the uplink E-CID positioning measurements includes timing advance information of a signal transmitted from the mobile device.

18. The method of claim 14 wherein the step of determining a geographic location of the mobile device further comprises adjusting each determined range to determine the geographic location of the mobile device.

19. The method of claim 18 wherein the adjustment of each range is approximately the same amount.

20. A method of determining the location of a mobile device in a communications network having a plurality of nodes comprising the steps of:
  (a) receiving observed time difference of arrival (OTDOA) measurements for a mobile device from one or more of the plural nodes;
  (b) receiving uplink enhanced cell identification (E-CID) positioning measurements from the mobile device;
  (c) determining one or more ranges between the plural nodes and the mobile device as a function of the received OTDOA measurements and received uplink E-CID positioning measurements;
  (d) adjusting each determined range as a function of a metric; and
  (e) determining a geographic location of the mobile device as a function the adjusted ranges.

21. The method of claim 20 wherein the adjustment of each range is approximately the same amount.

22. The method of claim 20 wherein the metric is determined as a function of a value selected from the group consisting of: downlink signal strength, UE Rx-Tx time difference, distance values between nodes, topography of the network, terrain, signal power, signal quality, presence of multipath, and combinations thereof.

23. The method of claim 20 wherein the E-CID positioning measurements include timing advance information of a signal transmitted from the mobile device.

* * * * *